July 3, 1962  J. H. MOYER  3,041,727
REPLACEABLE ANTERIOR TOOTH CONSTRUCTION
Filed Dec. 9, 1957

INVENTOR
JAMES H. MOYER
BY
CORBETT, MAHONEY, MILLER & RAMBO
BY W. S. Rambo
ATTORNEYS

United States Patent Office 3,041,727
Patented July 3, 1962

3,041,727
REPLACEABLE ANTERIOR TOOTH
CONSTRUCTION
James H. Moyer, Columbus, Ohio, assignor to The
Columbus Dental Manufacturing Co., Columbus, Ohio,
a corporation of Ohio
Filed Dec. 9, 1957, Ser. No. 701,651
4 Claims. (Cl. 32—9)

This invention relates to a replaceable anterior tooth construction. It has to do, more particularly, with an artificial replaceable tooth of the anterior type, either upper or lower, which has a body made either from porcelain or from a synthetic resin material of any suitable type generally used for artificial teeth, such as an acrylic resin.

The tooth of the present invention is of novel design and construction so that restorations, which are esthetically correct and completely sanitary, are possible. According to this invention, the present tooth body cooperates with a metal backing or other attaching device in a manner such that no metal will be visible from the labial side of the tooth, since the visible portion of the incisal edge is provided by the material of the tooth body rather than the backing. However, the tooth body and backing are so designed relatively that mesial and distal metal supporting portions are provided for greater strength. Also, the design and construciton of the tooth body and associated backing permits contact of the body of the tooth at the gingival end thereof with adjacent tissue, and also restores the lingual anatomy of a natural tooth. Furthermore, the tooth body and associated metal backing are so designed relatively that positive and accurate location of the tooth body results and forces developed during occlusion will merely produce a tighter fit between the tooth body and backing, thereby precluding accidental relative displacement. However, although the fit between the two members is enhanced by the forces of occlusion, the tooth body cooperates with the backing in such a manner that breakage will not occur as a result of such forces.

Further, the construction of the present tooth body lends itself to mass or standardized production methods which make possible replaceability or interchangeability of a given tooth body by another.

In the accompanying drawing, there is illustrated a tooth construction embodying this inevntion. In this drawing.

Figure 1:
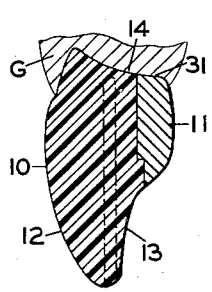
FIGURE 1 is a vertical sectional view taken along the line 1—1 of FIGURE 2 through the tooth body and associated backing of an upper anterior tooth of this invention and showing the gingival end of the tooth in contact with the gum tissue.

With particular reference to the drawing, in FIGURE 1 there is illustrated a complete anterior, upper pontic tooth mounted in association with the gum tissue illustrated at G. The tooth comprises the body 10 and the backing or supporting means 11. As indicated previously, the tooth body 10 is preferably formed of porcelain or it may be of a suitable plastic, such as an acrylic resin. The metal backing 11 is formed from the usual precious metals or alloys. The body 10 provides an exposed labial surface 12, a lingual surface 13 which is exposed adjacent the incisal edge thereof, and a gingival bearing surface 14 which is in contact with the gum tissue. It will be apparent from the following description that the labial surface 12 will be the only surface normally seen when the tooth is mounted in the mouth since the body 10 will completely hide the metal backing 11.

The tooth body 10 is mounted on the backing 11 by means of a mortise and tenon structure having novel characteristics. This structure will provide for a tight fit between the body and backing, which will be enhanced by the forces of occlusion, but will also provide a positive limit structure to prevent breakage of the body as a result of these forces.

Figure 3:
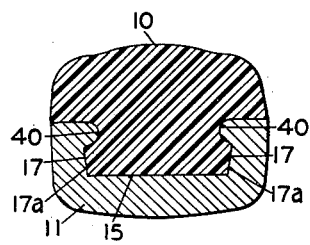
FIGURE 3 is a transverse, horizontal sectional view taken along line 3—3 of FIGURE 2 through the present tooth.
Figure 4:
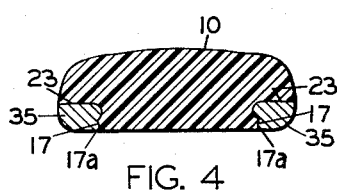
FIGURE 4 is a transverse horizontal sectional view taken along line 4—4 of FIGURE 2 through the tooth body and associated backing.
Figure 5:
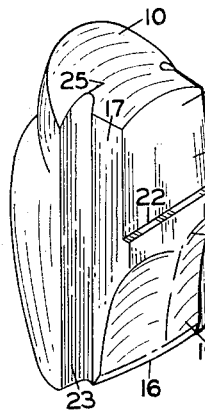
FIGURE 5 is a perspective view of the tooth body taken from the lingual side thereof.

The body 10 is illustrated in detail in FIGURE 5, and it will be noted that the body has a tenon 15 of substantial dovetail cross section formed on the lingual side thereof, which extends from the incisal edge 16 thereof to the gingival surface 14 thereof. It will be noted from the cross-sectional views of FIGURES 3 and 4 that the dovetail tenon 15 is reversed as compared to the usual arrangement so that mesial and distal edges 17 converge outwardly and do not provide the usual undercut groove arrangement so as to facilitate molding of the tooth body 10. Furthermore, the tenon 15 is so formed that the mesial and distal edges 17 thereof converge slightly from the incisal edge 16 to the gingival surface 14. This is evident from a comparison of FIGURES 3 and 4. Between these edges 17 on the rearward surface of the tenon, there is formed a lingual surface 19 which conforms to the corresponding lingual surface of a natural tooth which the artificial tooth of this invention is to replace. Inwardly of this surface 19 is a small backing-engaging bearing surface 20 which merges with the surface 19 along the compound curved line 19a and which is separated from a larger bearing surface 21 by a transveres limit shoulder 22. This bearing surface 21 terminates at the gingival surface 14.

The tenon 15 is of substantially less width than the body 10 of the tooth so as to provide the flat mesial and distal bearing surfaces 23 extending outwardly from the respective mesial and distal tenon edges 17. At the corners where the surfaces 23 and edges 17 join, the tenon edges 17 are undercut to provide the mesial and distal undercut grooves 25 which will aid in retaining the body 10 in association with the backing 11.

Figure 6:
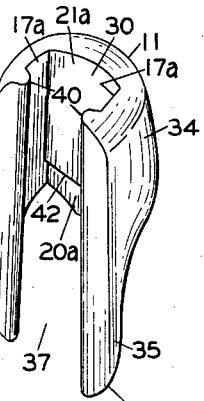
FIGURE 6 is a perspective view of the associated metal backing.
Figure 7:
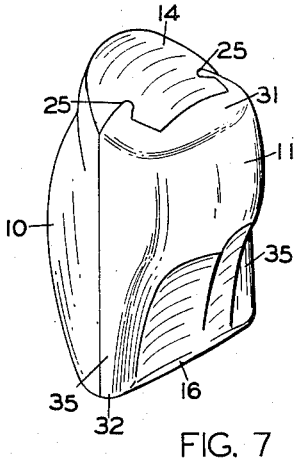
FIGURE 7 is a perspective view of the complete tooth showing the connected body and the backing, the view also being taken from the lingual side thereof.

The metal backing 11 is illustrated in FIGURE 6 and is formed so as to provide a mortise 30 extending from the gingival end 31 thereof to the incisal end 32 thereof. The backing 11 includes a stirrup-like body portion 34 adjacent the gingival end thereof and the mesial and distal talons 35 having the space 37 therebetween. The gingival end 31 is so formed that it also provides a continuation of the gingival bearing surface 14 of the tooth body 10 for contact with the gum tissue.

Figure 2:
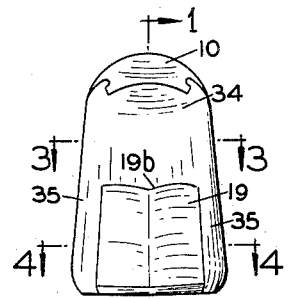
FIGURE 2 is an elevational view of the tooth of FIGURE 1, illustrating the exposed lingual surface of the tooth body.

The mortise 30 is formed so that it is complemental to the tenon 15 with the result that the tenon can be slipped into the mortise from the incisal end of the backing 11. Therefore, it will be apparent from a comparison of FIGURES 3 and 4 that the surfaces 17a of the mortise 30, which engage the mesial and distal edges 17 of the tenon 15, gradually converge from the incisal end 32 to the gingival end 31 of the backing. It will further be noted that these surfaces 17a extend the full length of the backing, even along the mesial and distal talons 35. Thus, the tenon 15 will be engaged along the complete length of the tooth body, even though the space 37 is provided between the mesial and distal talons 35 of the body, so as to expose the lingual surface 19 of the tooth body. It will be noted from FIGURE 2, that the stirrup-like portion 34 of the backing terminates along a compound curved line 19b which will conform to the curved line 19a on the tooth body.

Associated with the main tenon 15 and the mortise 30 of the cooperating tooth body 10 and backing 11, respectively, is an auxiliary mortise and tenon structure which includes the undercut mesial and distal grooves 25 of the tooth body 10. For cooperation with these undercut grooves 25, inwardly extending mesial and distal tenons or ribs 40 are formed throughout the length of the mortise 30 adjacent the outer side thereof. When the tooth body 10 is slipped onto the backing 11 by inserting the tenon 15 into the mortise 30, the ribs 40 will extend into and fill the undercut grooves 25.

It will be apparent that as the main tenon 15 is slipped into the mortise 30 from the incisal end of the backing 11 towards the gingival end thereof, the tenon will eventually tightly fit in the mortise, due to the cooperating tapered side surfaces of the mortise and tenon longitudinally thereof. Obviously, any occlusive forces on the incisal edge 16 of the body 10 would tend to further enhance this tight fit. However, to provide a positive limit or stop for this relative movement of the tooth body and backing, the mortise 30 is provided at its inner surface with a transverse stop shoulder 42, which is disposed at such a position intermediate the length of the mortise that when the stop shoulder 22 on the tooth body contacts therewith, the gingival end 31 of the backing will be located flush with and will form a continuation of the gingival bearing surface 14 of the tooth body. Towards the gingival end of the backing beyond the shoulder 42, the mortise 30 provides at its inner surface the bearing surface 21a which will contact the rearward bearing surface 21 of the tooth body and in the opposite direction beyond the shoulder 42, is the recessed surface 20a which will bear against the posterior bearing surface 20 of the tooth body.

Figure 8:
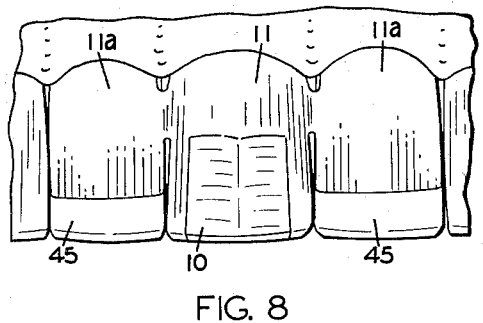
FIGURE 8 is an elevational view of the present tooth construction illustrating the same in operative relation to a pair of adjoining natural anchor teeth, and looking toward the lingual sides of the teeth.

As indicated in FIGURE 8, the backing 11 may be soldered, or otherwise suitably secured to a pair of laterally extended three-quarter metal backings 11a, which, in turn, are secured in the usual manner to adjoining natural anchor teeth 45. It will here be understood that the present tooth construction may be mounted singly or in multiples and used in combination with cast denture bases or removable bridges.

It will be apparent that with the tooth of this invention restorations are possible which are esthetically correct and completely sanitary. With the combination of tooth body and backing described above, only the labial surface of the tooth body is normally exposed to view. However, even though no metal is exposed toward the labial side of the tooth, mesial and distal incisally extending talons are provided on the tooth backing which will absorb thrust forces and therefore provide for greater strength in the tooth assembly. Furthermore, the backing and tooth body cooperate in such a manner that a lingual surface which simulates the lingual anatomy of a natural tooth is exposed by the backing adjacent the incisal end thereof for contact by the tongue. The tooth body and backing are so designed relatively that positive and accurate location of the tooth body results. Forces developed during occlusion will merely tend to retain this accurate relationship and produce a more effective fit between the tooth body and the backing, thereby preventing accidental relative displacement. However, positive limit stops are provided between the tooth body and the backing to preclude the setting up of such transverse stresses in the body as would result in breakage.

Various other advantages will be apparent.

I claim:

1. A replaceable anterior tooth construction comprising a substantially coextensive body and backing each terminating in exposed gingival and incisal ends respectively, a tenon formed on the rearward side of said body and extending the full length thereof, said backing having a mortise formed therein and extending the full length thereof which is complemental to and receives the tenon, said tenon having side edges converging toward the gingival end of the body and said mortise having cooperating sides similarly converging so that the tenon can be inserted from the incisal end of the mortise and thrusts at the incisal edge of the body will tend to enhance the contact of the side edges of the tenon with the cooperating sides of the mortise, and cooperating stop shoulders on the tenon and mortise intermediate the length thereof for providing a positive stop to limit movement of the tenon into the mortise toward the gingival end thereof, said cooperating stop shoulders serving to locate the tooth body and the backing positively in their substantially coextensive relationship and to act as bearing surfaces for aiding in absorbing the thrust forces developed in said body during occlusion.

2. A replaceable anterior tooth construction comprising a substantially coextensive body and backing each terminating in exposed gingival and incisal ends respectively, a tenon formed on the rearward side of said body and extending from the incisal edge thereof to the gingival end thereof, said backing having a mortise formed therein which is complemental to and receives the tenon and which extends from the incisal edge thereof to the gingival end thereof, said tenon having its side edges converging toward the gingival end of the body and said mortise having cooperating sides similarly converging so that the tenon can be inserted from the incisal end of the mortise and thrusts at the incisal edge of the body will tend to enhance the contact of the side edges of the tenon with the cooperating sides of the mortise, and cooperating stop shoulders formed on the rearward surface of the tenon and the adjacent surface of the backing at the mortise and extending transversely thereof the full width thereof and intermediate the length thereof for providing a positive sop to limit movement of the tenon into the mortise toward the gingival end thereof, said cooperating stop shoulders serving to locate the tooth body and the backing positively in their substantially coextensive relationship and to act as bearing surfaces for aiding in absorbing the thrust forces developed in said body during occlusion.

3. A replaceable anterior tooth construction comprising a substantially coextensive body and backing each terminating in exposed gingival and incisal ends respectively, a tenon formed on the rearward side of said body and extending from the incisal edge thereof to the gingival end thereof, said backing having a mortise formed therein which is complemental to and receives the tenon and which extends from the incisal edge thereof to the gingival end thereof, said tenon having its side edges converging toward the gingival end of the body and said mortise having cooperating sides similarly converging so that the tenon can be inserted from the incisal end of the mortise and thrusts at the incisal edge of the body will tend to enhance the contact of the side edges of the tenon with the cooperating sides of the mortise, cooperating stop shoulders formed on the rearward surface of the tenon and the adjacent surface of the backing at the mortise and extending transversely thereof the full width thereof intermediate the length thereof for providing a positive stop to limit movement of the tenon into the mortise toward the gingival end thereof, said cooperating stop shoulders serving to locate the tooth body and the backing positively in their substantially coextensive relationship and to act as bearing surfaces for aiding in absorbing the thrust forces developed in said body during occlusion, said side edges of the tenon being spaced from the corresponding edges of the body to provide backing contacting surfaces extending laterally from the tenon, said tenon having undercut grooves formed at the junction of the said bearing surfaces and the side edges of the tenon and extending the complete length thereof, and cooperating ribs for fitting into said grooves formed on the backing at the outer side of said mortise and extending the complete length thereof.

4. A replaceable anterior tooth construction according to claim 3 in which the side edges of the tenon also converge toward the outer surface of the tenon.

References Cited in the file of this patent
UNITED STATES PATENTS

| 830,887 | Craig | Sept. 11, 1906 |
| 1,433,997 | Frankel | Oct. 31, 1922 |
| 3,007,246 | Neustadter | Nov. 7, 1961 |

FOREIGN PATENTS

| 181,816 | Great Britain | July 19, 1922 |

OTHER REFERENCES

Lewald, Theodor: "Pontics Bei Festsitzenden Bruckenarbeiten" Vierteljahrsschrift fur Zahnheilkunde 48 Jahrg. Heft 1 (pages 129–143), see page 130.